United States Patent [19]

Larsen

[11] 3,867,617

[45] Feb. 18, 1975

[54] CONVERSION UNIT FOR ELECTRICAL SIGNAL SEQUENCES

[75] Inventor: Carl Ib Peder Larsen, Slagelse, Denmark

[73] Assignee: Haldex Aktiebolag, Halmstad, Sweden

[22] Filed: Mar. 22, 1973

[21] Appl. No.: 343,966

[30] Foreign Application Priority Data

Apr. 5, 1972 Sweden .............................. 4383/72

[52] U.S. Cl....... 235/151.32, 235/30 R, 235/92 PL, 235/152, 328/42

[51] Int. Cl......................... G06f 7/50, G07b 13/00

[58] Field of Search... 235/30 R, 33, 92 MT, 92 CP, 235/151.32, 151.33, 151.34, 175, 92 PB, 92 PE, 92 PL:152; 346/15; 340/347 DD; 328/42

[56] References Cited

UNITED STATES PATENTS

| | | | |
|---|---|---|---|
| 3,321,610 | 5/1967 | Currie, Jr. et al. | 235/151.33 X |
| 3,512,706 | 5/1970 | Bruce-Sanders | 235/30 R |
| 3,532,865 | 10/1970 | Karp et al. | 235/151.33 X |
| 3,532,866 | 10/1970 | Schaefer et al. | 235/175 |
| 3,703,985 | 11/1972 | Berg | 235/30 R |
| 3,751,642 | 8/1973 | Todd et al. | 235/151.34 |

*Primary Examiner*—Eugene G. Botz
*Assistant Examiner*—Jerry Smith
*Attorney, Agent, or Firm*—Robert E. Burns; Emmanuel J. Lobato; Bruce L. Adams

[57] ABSTRACT

A conversion device comprising a programmable counter which has a plurality of inputs receptive of a plurality of programming signals during use corresponding to a preselected pulse weighting function. The counter has another input responsive to a sequential pulse train applied thereto during use for developing only successive predetermined sets of output signals wherein each set corresponds to the binary representation of an integral multiple of said preselected pulse weighting function. The programmable counter is programmed by a binary digital logic code to effect a desired pulse weighting function.

7 Claims, 5 Drawing Figures

| | Q 1248 | 16 32 64 128 | |
|---|---|---|---|
| 0 | 0000 | 0 | 0 |
| 1 | 1101 | 0 | 11 |
| 2 | 0110 | 1 | 22 |
| 3 | 1000 | 01 | 33 |
| 4 | 0011 | 01 | 44 |
| 5 | 1110 | 11 | 55 |
| 6 | 0100 | 001 | 66 |
| 7 | 1011 | 001 | 77 |
| 8 | 0001 | 101 | 88 |
| 9 | 1100 | 011 | 99 |
| 10 | 0111 | 011 | 110 |
| 11 | 1001 | 111 | 121 |
| 12 | 0010 | 0001 | 132 |
| 13 | 1111 | 0001 | 143 |
| 14 | 0101 | 1001 | 154 |
| 15 | 1010 | 0101 | 165 |
| 16 | 0000 | 1101 | 176 |

| + | |
|---|---|
| D1 | 5 |
| D2 | 10 |
| D3 | 20 |
| D1-2 | 15 |
| D1-3 | 25 |
| D2-3 | 30 |
| D1-2-3 | 35 |

CONVERSION UNIT FOR ELECTRICAL SIGNAL SEQUENCES

The present invention relates to a conversion unit for electric signal sequences.

The invention relates, inter alia, to arrangements for converting electric signals generated by signal generating means and indicative of distances travelled into signals from which fares incurred can be electronically calculated and registered, primarily on electronic fare meters.

When designing an electronic fare meter to suit a device which generates signals indicative of a distance travelled, it is necessary to take special measures with each particular type of vehicle in which the fare meter is to be used. With mechanical and also electronic fare meters it is normal practice to insert between a transmission means, connected to one of the wheel shafts, and intermediately located output wheel of a gear transmission so that the number of revolutions of the distance signal generating means for each distance travelled, is always the same, irrespective of the type of vehicle concerned. Particularly with fare meters provided with electronic counters, it is less suitable to arrange mechanical gear means between the transmission means connected to the wheels and the signal generating means. It is more convenient with such apparatus to utilize the direct signals which can be obtained from an electric signal generating means connected to the wheels and to electronically convert these signals into counter signals suitable for feeding to the counter and registering mechanism of the fare meter.

The present invention relates to an electronic signal converting unit primarily intended for use as an intermediate circuit between the distance signal generating means connected to the vehicle wheels and a subsequent electronic counter and which, in a modified form, can also be used as a fare re-setting circuit and also as a converter in debiting units. The conversion unit according to the present invention represents a considerable simplification of devices previously used for the same purpose. In the present connection it is normal to use a combination of mechanical and electrical transmission arrangements. The characteristic feature of all previously known devices, however, is that high requirements are placed on the number of signals for the requisite accuracy of subsequent fare calculating means. The reason for this resides in the arrangement of the intermediate circuit used, this circuit operating on the basis of signal frequency division, preferably in binary electric counters. In certain instances, electro-optic perforated discs having disposed therein a large number of holes, or drums having a large number of magnetic elements mounted thereon are arranged to provide a sufficiently high signal frequency. These arrangements operate as means for generating signals indicative of the distance travelled. The adaption of individual arrangement for different types of vehicle is effected by changing the perforated discs or by changing the transmission ratio by resetting the signal frequency division number. Another measure taken in this connection is the change in transmission ratio in associated gearing used to obtain a high number of signals.

The present invention is provided in an attempt to bridge the aforementioned methods, while the object of the invention is to produce simple and, above all, inexpensive electronic fare meters by using uncomplicated distance signal generating devices without mechanical transmission means.

Accordingly, the conversion unit of the present invention is mainly characterized by programmable counting means including a binary counter chain comprising a predetermined number of bistable flip flops controlled and interconnected by means of an EXCLUSIVE-OR gate, the signals being transferred over said gate which can be clocked in a predetermined manner by means of signals, such as the signals generated by the distance signal generator, irrespective of the position of the preceding flip-flop.

The invention will now be described in more detail with reference to the accompanying drawings, in which FIG. 1 illustrates graphically a counter for a distance signal generator and fare re-setting circuit.

Figures 1, 3:
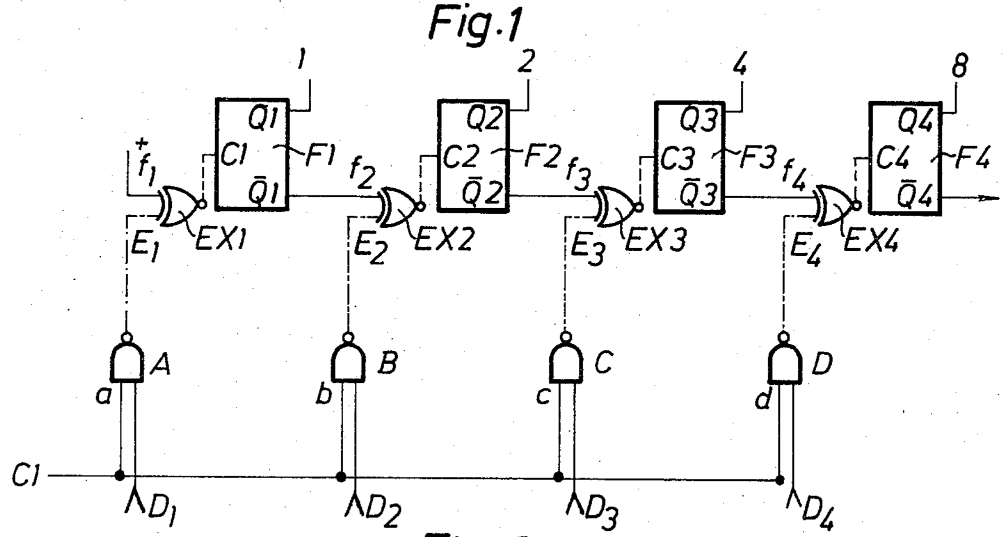
FIG. 3 illustrates an addition table applicable for the addition of the number 11.

The counter illustrated in FIG. 1 is composed of a number of series-connected identical circuits, four such circuits being illustrated and each of which includes a positively controlled master-slave flip-flop F1, F2, F3 and F4 clocked by the negative edge of an incoming signal, an EXCLUSIVE-OR gate EX1,EX2-,EX3 and EX4, and a NAND gate A,B,C and D, which is clocked in accordance with the circuit of FIG. 1 by means of input distance signals. In the following description a so-called high logic level is designated 1:*a* and a low logic level is designated 0:*a*. If a 1:*a* is applied to the input D1 simultaneously as an 0:*a* is applied to the input D2,D3 and D4, the circuit will function as a known type of ripple counter when clocked by signals on input C1. When the input C1 receives 0:*a*, the outputs of the gates A,B,C and D will receive 1:*a*, said outputs being connected with the gate EX1, EX2, EX3 and EX4. Since one input of the first EXCLUSIVE-OR gate EX1 has 1:*a* as a result of the connection to +, its output connected to the C1-input on flip flop F1 will receive 0:*a* when the other input E1 of EX1 has 1:*a*. The remaining three EXCLUSIVE-OR gates EX2, EX3 and EX4, however, are connected with the outputs $\bar{Q}$ of the preceding master slave flip-flops. The master slave flip-flops are assumed to start so that the $\bar{Q}$-outputs have position 1 and the Q-outputs position 0. In this initial state, 0:*a* is thus on the output Q1 of the flip flop F1. At the same time 1:*a* is on the outputs of gates B, C and D and hence the gates EX2, EX3 and EX4 deliver 0:*es* to the C inputs of flip flops F2, F3 and F4. If the clock pulse to CL now shifts to 1:*a* and 1:*a* is applied to D1 in accordance with the aforegoing, the output of gates A will shift to 0:*a*, whereupon the input C1 on the flip-flop F1 assumes 1:*a*. When CL returns to 0:*a* the result is that CL reassumes 0:*a*, which causes the F1 output Q1 of the master slave flip-flop to shift to 1:*a* and output $\bar{Q}1$ to 0:*a*, which in turn means that C2 obtains 1:*a* on flip-flop F2, similarly output Q1 of F1, although with the delay in time present in the gate EX2. The counter as an entirety is now set on the binary number 1, i.e., the output Q1, Q2, Q3 and Q4 have the levels 1:0, and 0 respectively. For each new signal to the CL input there is added one unit to the said binary number. If, instead, 0:*a* is supplied to D1 and 1:*a* to D2, the counter will count 2+2 etc. for each CL signal. If 1:*a* is applied to both D1 and D2, the first clock pulse will result in both F1 and F2 shifting position on the negative edge of the clock pulse, which then simultaneously reaches to C1 and C2, both delayed by the gates A and EX1 and B and EX2 respectively. The output $\bar{Q}$ of F1 has now shifted to 0:*a* and this has resulted in that C2 has shifted to 1:*a*. When the next clock signal again changes to 1:*a*, C2 will shift to 0:*a*. F2 again shifts position, which in turn forces F3 to shift. When the clock signal returns to 0:*a*, the result is that F1 shifts position and it will now be apparent that the first signal results in the binary number 3 and the second signal in the binary number 6, thus in practice an addition.

Figure 2:
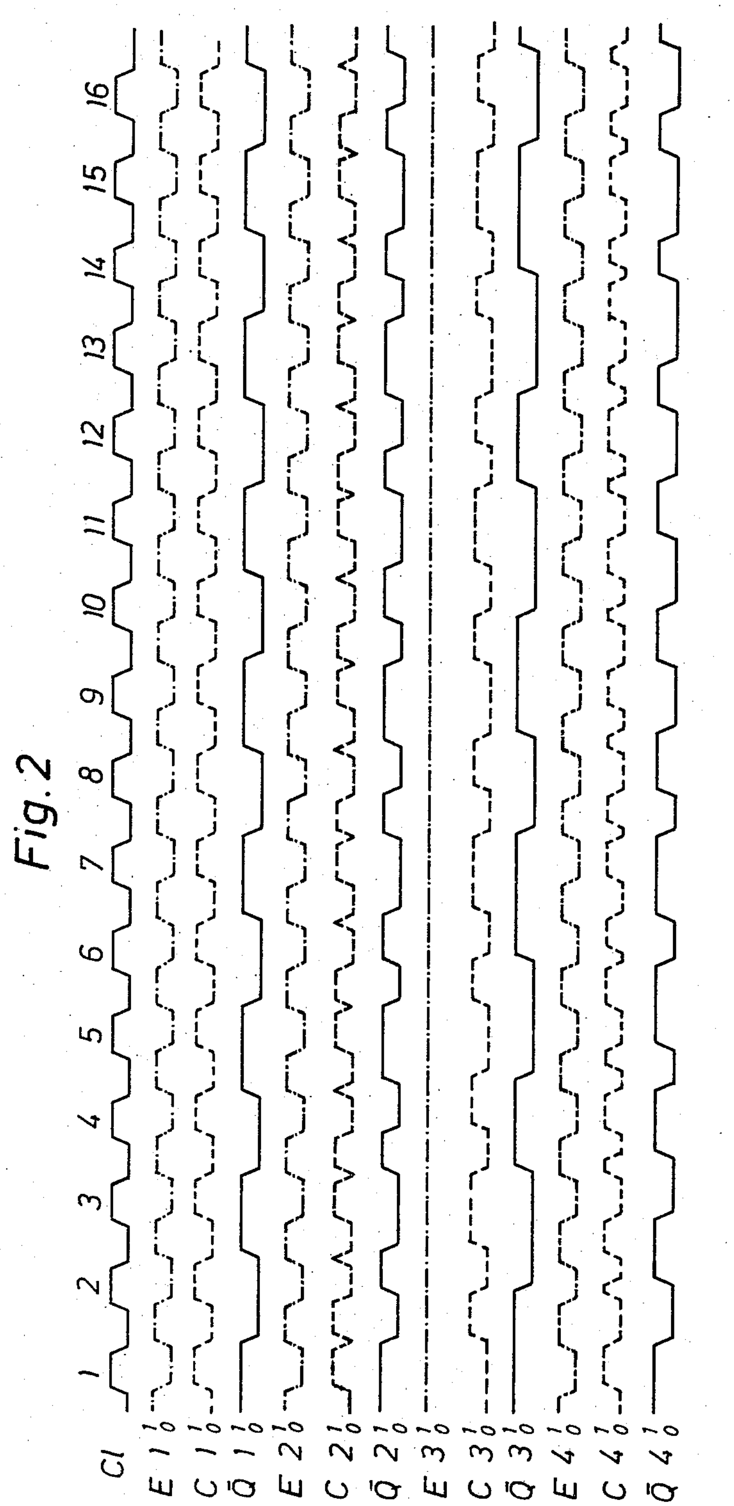
FIG. 2 illustrates the signal shapes occurring in the counters when feeding thereto a train of signals arriving from the distance signal generator.

FIG. 2 illustrates an example of the curve shape obtained when D1, D2 and D4 are programmed with 1:*s* and D3 and 0, which means that the counter is clocked with the binary number 11. At the same time it is evident from the curve that 16 input signals result in 11 output signals.

FIG. 3 illustrates an addition table applicable for adding the number 11. If the logic levels of the D-inputs are now controlled in a predetermined manner, it is possible to vary the number added with itself each time a clock pulse is applied to the counter.

Figure 4:
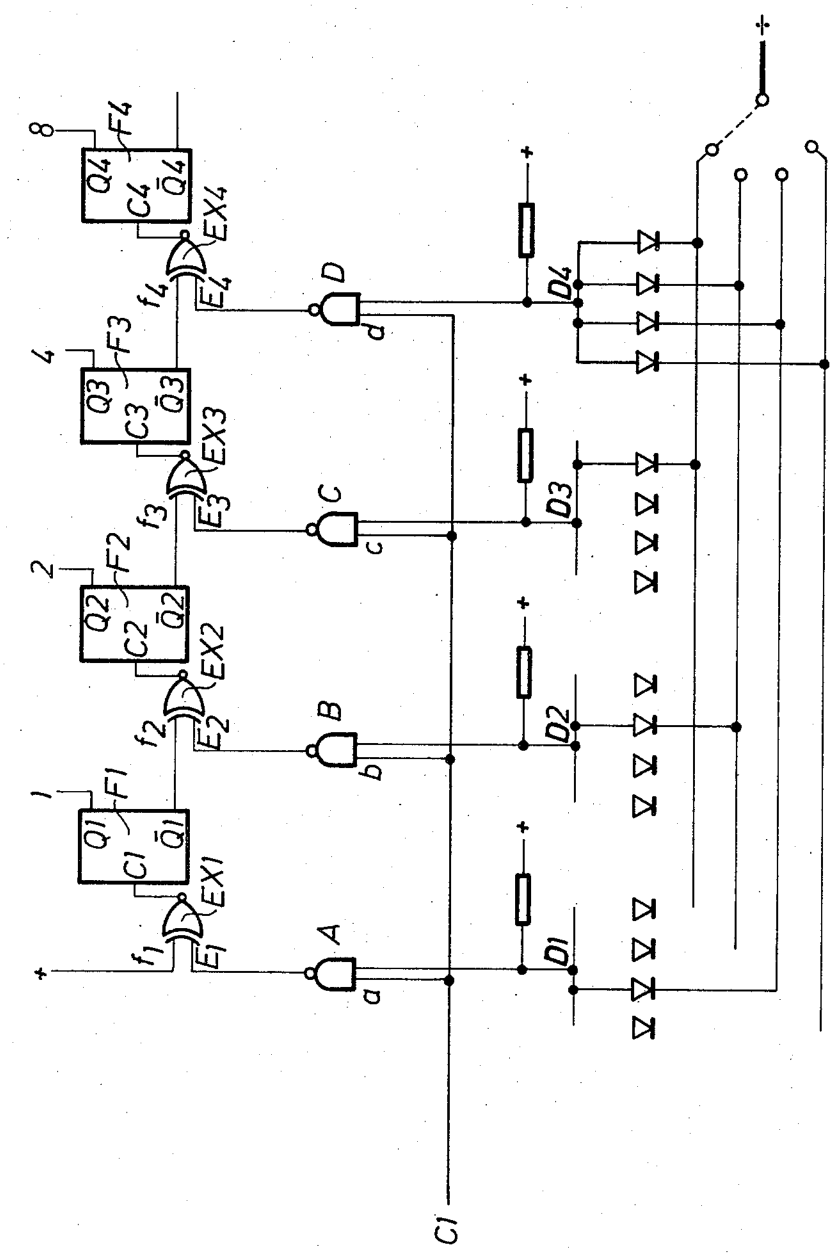
FIG. 4 illustrates diagrammatically the possibility of varying the conversion number in connection with fare re-setting circuits.

Variation of the conversion number is, for example of current interest in connection with fare re-setting circuits. A conversion unit according to the present invention can be readily converted for use as a fare resetting circuit, such as that illustrated in FIG. 4 where a switch controls a diode matrix D1, D2, D3 and D4 for setting the conversion number, i.e., setting different fares.

Figure 5:
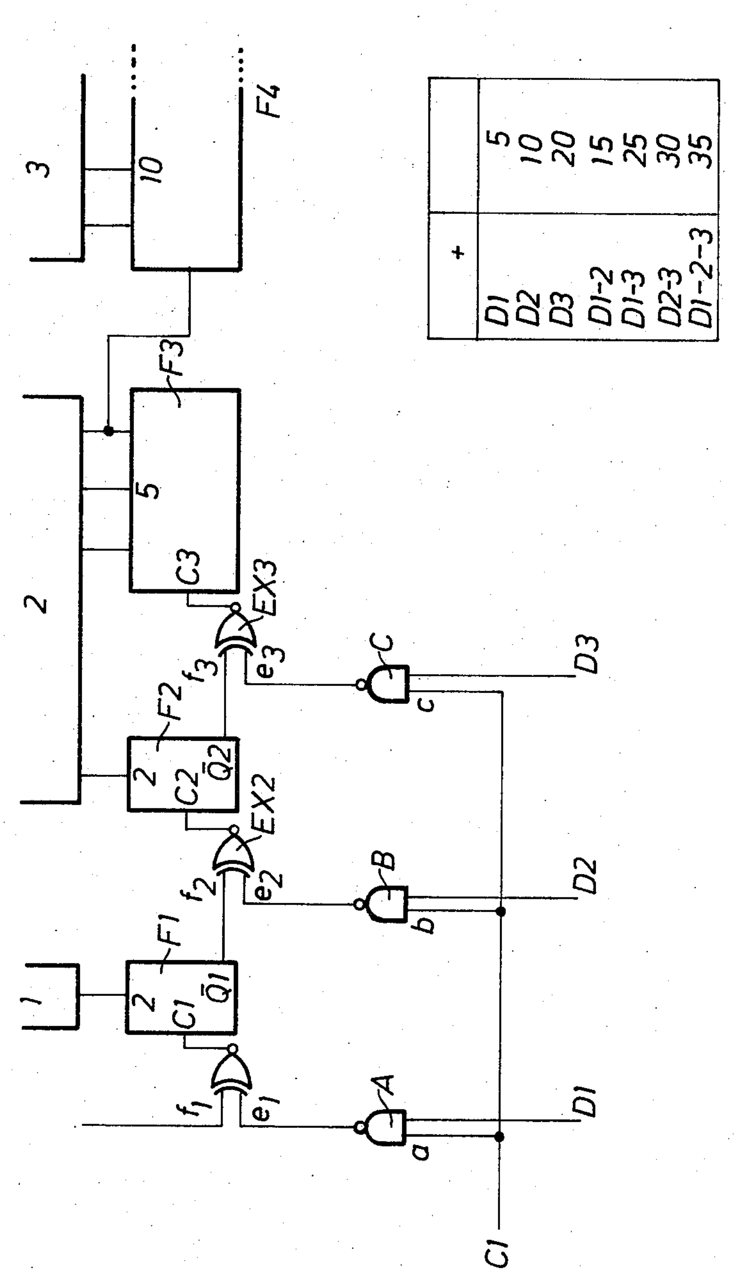
FIG. 5 illustrates how variations in the nagnitude of the debiting unit are produced in digit display fare meters over an illuminated digit.

When it is desired to vary the size of the debiting unit, this can readily be effected in a fare meter with digital presentation over an illuminated digit by applying the same principle. FIG. 5 illustrates diagrammatically such an arrangement with three illuminated digits, the circuits of which are connected to respective flip-flops F1, F2, F3 and F4, reading of the unit being effected in accordance with the table shown in FIG. 5.

In accordance with the present invention, such a signal generating means can be used to advantage for generating signals indicative of the distance travelled, the generator providing one or at most four signals per revolution. The signal generating means is suitably arranged in co-operation with the speedometer of the vehicle in question. As previously known, the speedometer is operated by a Bowden-cable. As a result of their construction and length, such cables have a certain degree of torsion which, when the cable is subjected to load, may reach to approximately a quarter-turn rotation. It is thus impracticle to arrange signal generators which have signal numbers greater than four per revolution of the Bowden cable, since with torsion oscillations in the axis, for example during starting or stopping sequences, a plurality of false signals may be applied to the fare calculating circuit. Owing to the construction of the present counter circuit, the number of signals generated is suitably such that one signal is obtained for each rotation of the cable in question. It should be mentioned in this respect that since adaption of the signals is effected owing to the fact that the signals are counted by fraction division, a low number of signals can be used. In order to obtain sufficient accuracy, systems which use binary signals frequency division must be based on a relatively high number of signals.

With a system according to the invention which utilizes 8 binary digits (bits) and which has a conversion factor between 1 and 2, the tolerance is less than 0.4 percent. The number of bits, however, must increase in number with the conversion factor in order to maintain the same tolerance. The use of two such units in an electronic fare meter affords the advantage whereby programming of input revolutions per kilometer and the adjustment of fares are independent of each other and that when adjusting fares no signal loss occurs, since digit units are automatically added to the digits previously calculated, although with other values.

With a signal generator constructed to generate four signals per revolution, the counter shall be programmed with a binary number corresponding to the following formula:

$$1000 \cdot 256/\text{rpm/km} \cdot 4 \cdot \text{desired distance per signal}$$

where 256 is an assumed binary magnitude $= 2^8$.

The arrangement of the present invention is not restricted to use in connection with fare meters, but can be applied within other technical fields where signal quantity reduction is sought for, for example in the programmed control of circuits for work-shop machines and the like.

What I claim is:

1. A conversion device comprising: programmable counting means receptive of a plurality of programming signals during use corresponding to a preselected pulse weighting function and having an input responsive to a sequential pulse train applied thereto during use for developing only successive predetermined sets of output signals wherein each set corresponds to the binary representation of an integral multiple of said preselected pulse weighting function; and means for programming said programmable counting means to effect a desired pulse weighting function, said programmable counting means comprising a first plurality of counting stages each including a flip-flop having a clock input and an inverting output and a non-inverting output from which one of said output signals of said set of output signals is taken, an Exclusive-Or gate having two inputs and one output connected to the clock input and a Nand gate having one input receptive of one of said programming signals and another input receptive of the sequential pulse train signal and having an output connected to one input of said Exclusive-Or gate, and wherein the other input of the Exclusive-Or gate in each stage after the first is connected to the inverting output of the flip-flop of the preceding stage.

2. A conversion device according to claim 1, wherein said means for programming comprises means for developing a binary digital logic signal and applying one digit of same to each said one input of said Nand gates.

3. A conversion device according to claim 1, wherein said means for programming comprises means for developing a binary digital signal code and applying same to said counting means.

4. A conversion device according to claim 3, wherein said means for developing said binary digital signal code comprises a diode matrix and means for selecting desired matrix lines.

5. A conversion device according to claim 4, wherein said means for selecting desired matrix lines comprises a multicontact switch.

6. A conversion device according to claim 1, further comprises display means receptive of said sets of output signals for displaying the decimal representation thereof.

7. A conversion device comprising, a plurality of flip-flops each having a clock input, an inverting output and a non-inverting output and each operable to develop electrical binary output signals, and circuit means receptive of an input pulse train and electrical signals representative of a binary weighting function to switch said flip-flops to develop output signals jointly representative of a sequence of binary numbers equal to consecutive integral multiples of said binary weighting function, said circuit means comprising a plurality of Exclusive-Or gates each having a pair of inputs and an output, means electrically connecting an output of each of said Exlcusive-Or gates to a clock input of a corresponding one of said flip-flops, means for applying an electrical signal to one input of one of said Exclusive-Or gates, means electrically connecting one input of the remaining ones of said Exlcusive-Or gates to the inverting input of a second corresponding flip-flop, a plurality of Nand gates each having a pair of inputs, means electrically connecting the output of each of said Nand gates to the remaining input of a corresponding one of said Exclusive-Or gates, means electrically connecting one of the inputs of each of said Nand gates in common for applying said input pulse train thereto, and means for applying said electrical signals representative of a binary weighting function to the remaining Nand gate inputs.

* * * * *